No. 674,486. Patented May 21, 1901.
S. J. TALBOT.
EDUCATIONAL APPLIANCE.
(Application filed Apr. 3, 1901.)
(No Model.)
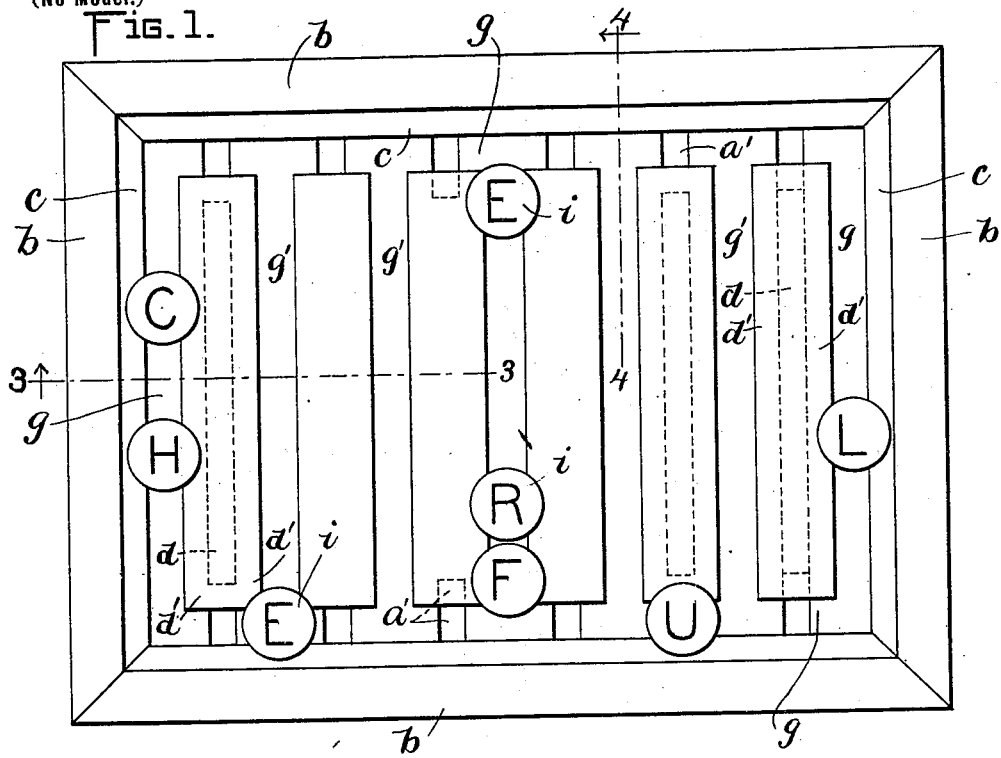
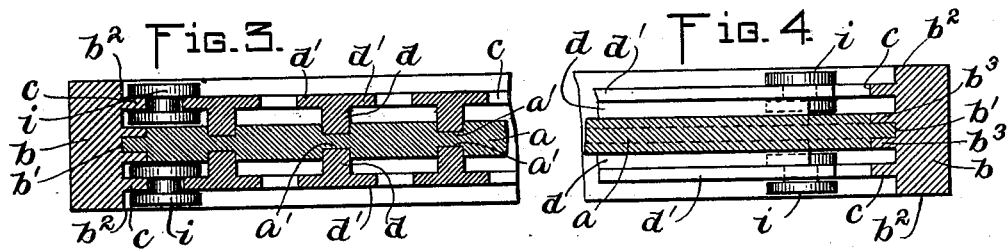
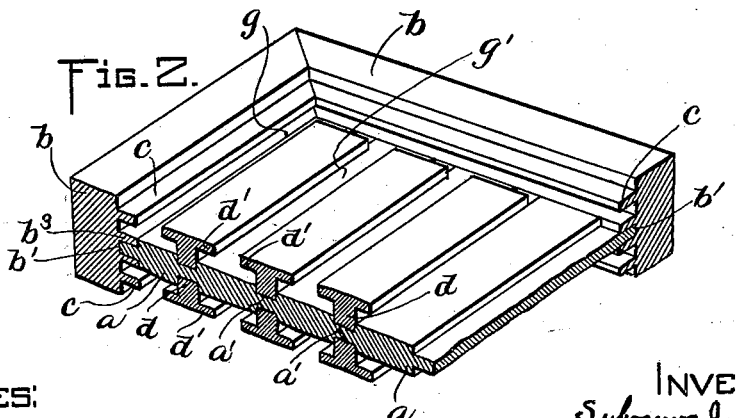
WITNESSES:
INVENTOR:
Sylvanus J. Talbot
by Wright, Brown & Quinby
Attys.

UNITED STATES PATENT OFFICE.

SYLVANUS J. TALBOT, OF LYNN, MASSACHUSETTS, ASSIGNOR OF ONE-HALF TO HENRY HASKELL, OF WAKEFIELD, MASSACHUSETTS.

EDUCATIONAL APPLIANCE.

SPECIFICATION forming part of Letters Patent No. 674,486, dated May 21, 1901.

Application filed April 3, 1901. Serial No. 54,186. (No model.)

*To all whom it may concern:*

Be it known that I, SYLVANUS J. TALBOT, of Lynn, in the county of Essex and State of Massachusetts, have invented certain new and useful Improvements in Educational Appliances, of which the following is a specification.

This invention relates to appliances for teaching spelling, &c., by the use of blocks movable in guides or grooves on a board or table, the grooves being arranged so that a supply of blocks can be held in place on the board and can be moved about and assembled in rows to form the desired combinations of letters to spell words, &c.

The invention has for its object to provide a simple, strong, durable, and inexpensive construction whereby each of two sides of a board can be made available for educational purposes and whereby the body portion of the board is securely confined and prevented from warping.

The invention consists in the improvements which I will now proceed to describe and claim.

Of the accompanying drawings, forming a part of this specification, Figure 1 represents a plan view of an educational appliance embodying my invention. Fig. 2 represents a perspective view of a portion of the appliance. Fig. 3 represents a section on line 3 3 of Fig. 1. Fig. 4 represents a section on line 4 4 of Fig. 1.

The same reference characters indicate the same parts in all the figures.

In the drawings, $a$ represents a rectangular board, which may be of wood or any other suitable material and has flat parallel sides in which are formed grooves $a'$. $d\ d$ represent strips formed at their inner edges to fit said grooves and firmly secured thereon by any suitable means, such as glue or cement. The strips $d$ are provided at their outer portions with flanges $d'\ d'$, which project from the sides of the strips, as shown in Figs. 2 and 3, and also from the ends of the strips, as shown in Fig. 4, said flanges projecting over portions of the sides of the board and constituting walls of undercut grooves.

Surrounding the board is a rectangular frame composed of the frame pieces or members $b\ b\ b\ b$. Each of these members is composed of a single piece, preferably of wood, having in its inner side a groove $b'$, arranged midway between its edges. The grooves $b'$ are formed to receive and closely fit the edges of the board and are glued or otherwise firmly secured thereto, the ends of the frame members being mitered and firmly connected in any suitable way to form a rigid frame. On the inner sides of the frame members $b$ are formed inwardly-projecting flanges $c$, which are arranged in the same planes with the flanges $d'$ of the strips $d$ and project over portions of the sides of the board $a$. As will be seen by the drawings, the flanges $c$ coöperate with the flanges projecting from the ends of the strips $d$ and with the edge flanges of the two outer strips $d$ in forming a continuous marginal groove $g$, while the adjacent flanges on the strips $d$ form sides of a series of parallel grooves $g'$, which communicate at their ends with the grooves $g$. The grooves thus formed are adapted to receive blocks $i$ of the form shown in Fig. 1 and 3, each block being button-shaped—that is to say, composed of an outer head, an inner head, and a connecting-shank, the diameters of the heads being greater than the width of the portions of the grooves between the flanges $c$ and $d'$, while the connecting-shanks have a diameter smaller than the width of said grooves, so that the blocks can slide freely in the grooves, but cannot be removed therefrom. The said blocks may have letters or other characters or symbols inscribed upon the outer surfaces of their heads and may be grouped in any desired way in the parallel grooves $g'$, the marginal grooves $g$ constituting reservoirs for buttons not in use.

It will be seen that the frame members $b$, each composed of a single piece extending across one edge of the board and grooved to receive said edge and cover the adjacent portions of the side of the board, said members being also firmly secured together at their corners, constitute a strong and durable holder for the board, preventing it from being warped and cracked, and at the same time, in connection with the strips $d$, duplicated on each side of the board, constituting a two-sided or reversible board, which enables a large number of blocks to be used with a relatively small structure for holding and guiding the blocks.

The width of each frame member $b$ is preferably considerably in excess of the distance between the outer surfaces of the flanges $d'$ on one side of the board and the outer surfaces of the flanges $d'$ on the opposite side of the board, so that the edges $b^2$ $b^2$ of the frame members constitute guards and rests which prevent the heads of the buttons on the under side of the board from coming in contact with the surface of a table on which the appliance may be placed, thus protecting the outer surfaces of the heads from wear and abrasion and preserving the legibility of the character thereon.

The grooves $b'$ in the inner sides of the frame-pieces $b$ are preferably formed between flanges $b^3$ $b^3$, Fig. 4, on the pieces $b$ between the flanges $c$ $c$, the edges of the board entering said grooves $b'$ being preferably tongued or reduced in width to form shoulders abutting against the outer edges of the flanges $b^3$. This construction enables the glue employed to unite the parts to make very firm and durable joints, which will prevent the board $a$ from warping.

I claim—

1. An educational appliance comprising a rectangular board having two series of flanged strips, one series on each side, said strips forming walls of undercut grooves, and a rectangular frame inclosing the board and composed of members which are centrally grooved on their inner sides to receive the edges of the board and project equally from both sides of the board, their inner sides having flanges cooperating with the end flanges of the strips and with the outer side flanges of the outer strips in forming a marginal undercut groove communicating with the grooves between the strips, said frame members extending across the edges of the board and covering said edges and adjacent portions of the sides of the board, whereby the board is marginally confined and prevented from warping.

2. An educational appliance comprising a rectangular board having two series of flanged strips, one series on each side, said strips forming walls of undercut grooves, and a rectangular frame inclosing the board and composed of members which are centrally grooved on their inner sides to receive the edges of the board and project equally from both sides of the board, their inner sides having flanges cooperating with the end flanges of the strips and with the outer side flanges of the outer strips in forming a marginal undercut groove communicating with the grooves between the strips, said frame members extending across the edges of the board, and so exceeding in width the distance between the outer surfaces of the flanges of the strips on one side of the board and the outer surfaces of the flanges on the opposite side of the board, that their edges serve as guards to prevent contact between buttons in said grooves and a surface on which the appliance may rest.

In testimony whereof I have affixed my signature in presence of two witnesses.

SYLVANUS J. TALBOT.

Witnesses:
FREDERICK W. YOUNG,
CHARLES F. HARTSHORNE.